United States Patent [19]

Brown

[11] Patent Number: 4,922,711

[45] Date of Patent: May 8, 1990

[54] THRUST REVERSING SYSTEM FOR HIGH BYPASS FAN ENGINES

[75] Inventor: Robert B. Brown, Renton, Wash.

[73] Assignee: The Boeing Company, Seattle, Wash.

[21] Appl. No.: 205,184

[22] Filed: Jun. 10, 1988

[51] Int. Cl.⁵ .............................. F02K 1/72
[52] U.S. Cl. .................... 60/204; 60/226.2; 60/230; 60/39.31; 239/265.27; 239/265.35
[58] Field of Search ............ 60/204, 226.2, 232, 60/230, 228, 229, 39.31; 239/265.31, 265.35, 265.27, 265.29; 244/110 B, 54, 23 D, 12.5

[56] References Cited

U.S. PATENT DOCUMENTS

| | | | |
|---|---|---|---|
| 3,262,271 | 7/1966 | Beavers | 60/226.2 |
| 3,279,182 | 10/1966 | Helmintoller | 60/226.2 |
| 3,483,702 | 12/1969 | Ward | 60/226.2 |
| 3,600,894 | 4/1970 | McClain | 60/226.2 X |
| 3,608,314 | 8/1969 | Colley | 60/226.2 |
| 3,660,982 | 5/1972 | Goslan | 60/226.2 X |
| 3,691,771 | 9/1972 | Colley | 60/226.2 X |
| 3,704,829 | 12/1972 | Hall | 60/230 |
| 3,779,010 | 12/1973 | Chamay et al. | 60/226.2 |
| 3,835,643 | 9/1974 | DeGarcia, Jr. et al. | 60/230 |
| 3,837,411 | 9/1974 | Nash et al. | 60/230 |
| 3,844,482 | 10/1974 | Stearns | 60/226.2 X |
| 3,915,415 | 10/1975 | Pazmany | 60/226.2 X |
| 3,917,198 | 11/1975 | Sanders | 60/226.2 X |
| 3,981,463 | 9/1976 | Pazmany | 60/226.2 X |
| 4,000,612 | 1/1977 | Wakeman et al. | 60/230 |
| 4,026,105 | 5/1977 | James | 239/265.31 |
| 4,073,440 | 2/1978 | Hapke | 60/226.2 X |
| 4,183,478 | 1/1980 | Rudolph | 60/226.2 X |
| 4,216,926 | 8/1980 | Lawson | 60/226.2 |
| 4,731,991 | 3/1988 | Newton | 60/226.2 |
| 4,801,112 | 1/1989 | Fournier et al. | 60/226.2 |

Primary Examiner—Donald E. Stout
Attorney, Agent, or Firm—Hughes & Multer

[57] ABSTRACT

In the preferred configuration, the assembly is characterized in that the lateral and longitudinal thrust reserving loads exerted on the thrust reversing subassembly are transmitted into the fan duct structure which is arranged to in turn transmit these thrust reversing loads into outer structure to which the jet engine and thrust reversing assembly is mounted.

In the preferred from, there are vane means which, with the thrust diverting structure in the thrust reversing position, is positioned in the thrust reversing opening to properly direct flow through the thrust reversing opening. Also in the preferred form, the thrust diverting structure is pivotally mounted to the fan duct structure at a lower location so that the thrust diverting structure rotates with a downward component of motion to the thrust reversing position, so that the thrust diverting opening is directed upwardly.

74 Claims, 10 Drawing Sheets

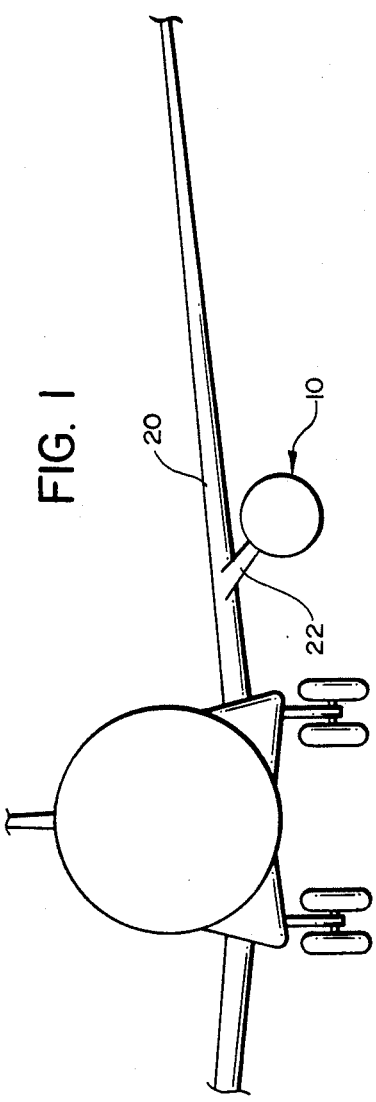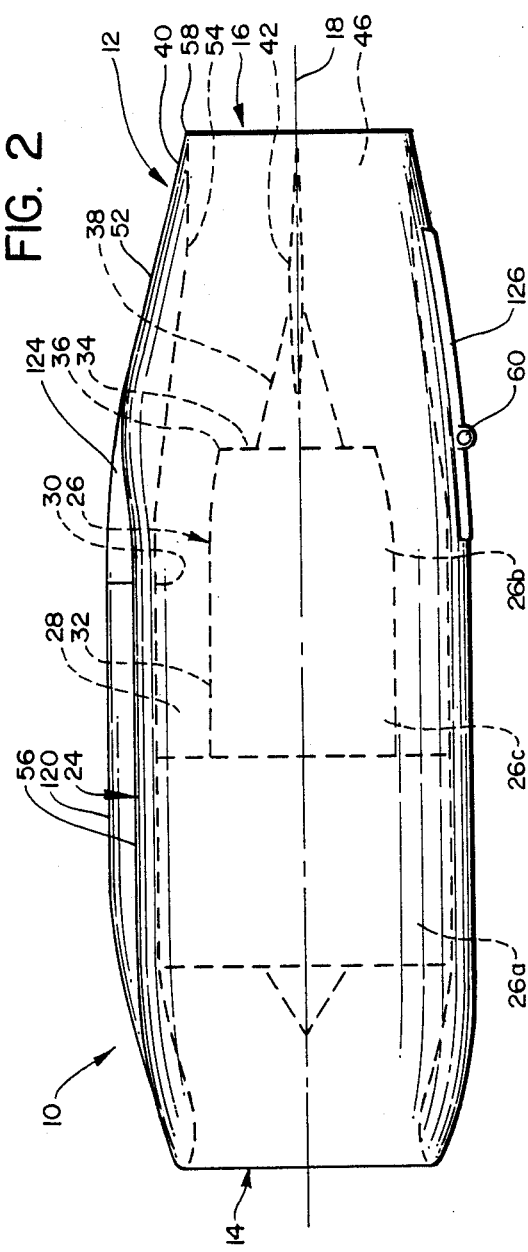

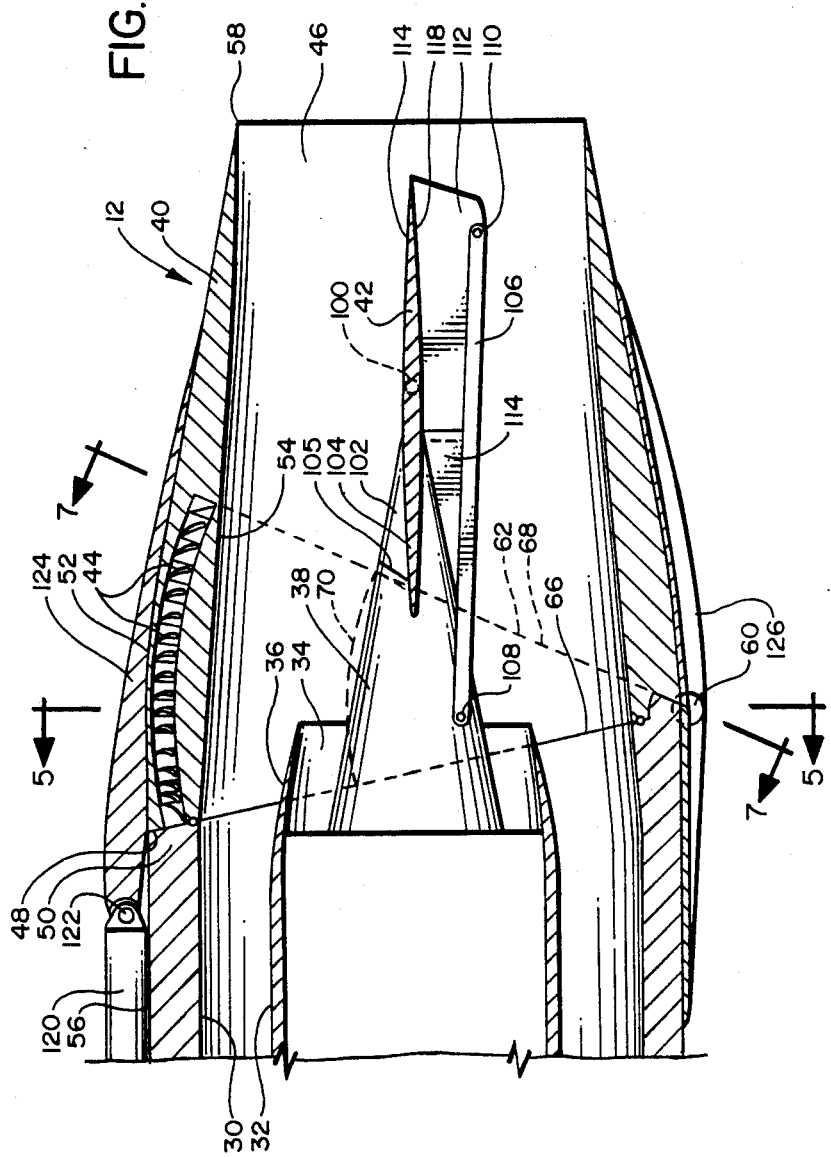

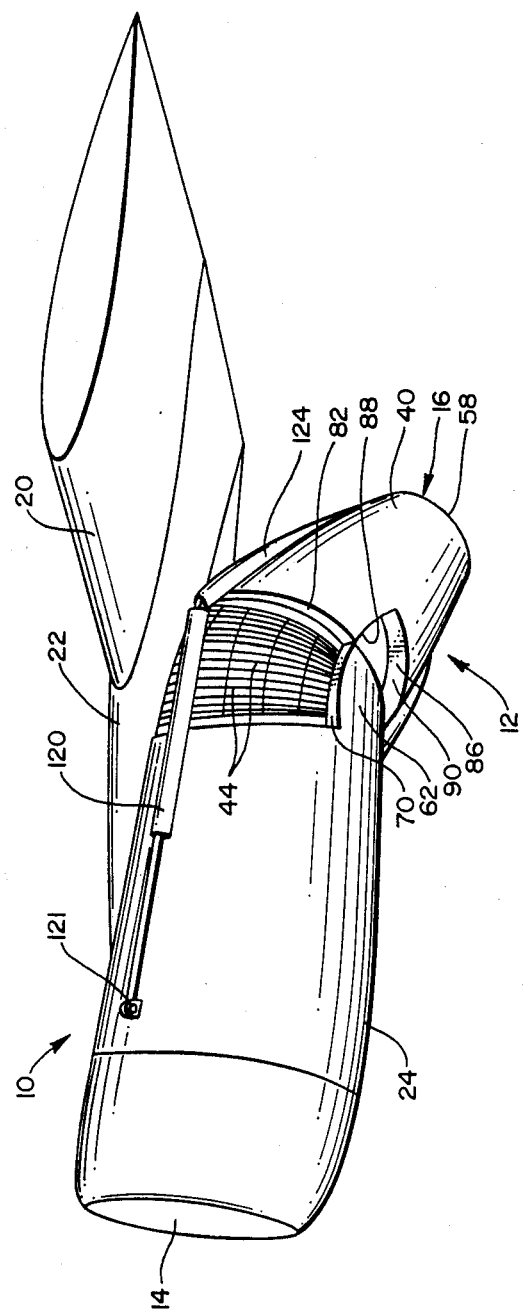

THRUST REVERSING SYSTEM FOR HIGH BYPASS FAN ENGINES

BACKGROUND OF THE INVENTION

1. Field of the Invention

The present invention relates to a thrust reversing system for an aircraft, and more particularly to such a thrust reversing system particularly adapted for use with high bypass long duct fan engines.

2. Background Art

The design of effective thrust reversers has been a problem in the aircraft industry for a number of decades. Ideally, in the stowed configuration for cruise, the thrust reversing mechanism should be located so as to minimize any drag and also so as not to interfere with the operating components of the engine. This requirement is oftentimes incompatible with the need to provide effective reverse flow of the engine exhaust. The result is often a compromise between these two requirements.

Another problem is that some thrust reversers operate in such a way that at least part of the reversed flow is directed toward the ground so as to blow up dirt or small rocks which might then be drawn into the engine inlet. A related problem is that the reversed flow can be reingested back into the engine inlet. Further, many of the prior art thrust reversing mechanisms are expensive and have maintenance problems.

It is also desirable that the reversal of flow be accomplished in a manner that the reversed flow does not create any lift on the wing so as to take loads off the main gear or nose gears, and a corollary of this is that a desired feature of a thrust reversing system is to create greater loading on those gears. Another problem is that some thrust reversing mechanisms detract from the rudder and fin effectiveness of the aircraft.

A search of the patent literature has disclosed a number of patents related to thrust reversers, and these are recited below:

U.S. Pat. No. 3,262,271 (Beavers) shows a thrust reverser for a fan jet engine which reverses only the fan flow. There are plurality of isosceles-shaped flaps 22 which pivot from the fan cowl into the blocking position. This fan cowl section 19 moves rearwardly to expose vanes 38. The core exhaust is not reversed, and the exhaust appears to be uniformly reversed around the entire periphery of fan area.

U.S. Pat. No. 3,279,182 (Helmintoller) shows a thrust reversing system which is similar in principle to the Beavers patent discussed immediately above.

U.S. Pat. No. 3,483,702 (Ward) shows a thrust reverser having the same basic operating principles as the two patents noted immediately above (i.e., Beavers and Helmintoller). There are inner and outer flaps 26 and 25 which move to cause the thrust reversal, and there are guide vanes 44 that are attached to piston rods 40.

U.S. Pat. No. 3,600,394 (McClain) shows a thrust reverser operating to reverse the fan jet in accordance with the same operating principles as the three patents discussed immediately above. The doors 50 are pivotally mounted at 54 and are moved to the blocking position as section 28 moves rearwardly.

U.S. Pat. No. 3,608,314 (Colley) is another example of a thrust reverser having the same operating principles as the four discussed above. The reversing flaps 28 comprise the flap sections 30 and 32, and the aft section of the cowl moves rearwardly to uncover the vanes.

U.S. Pat. No. 3,660,982 (Goslan) shows a variety of thrust reversing arrangements somewhat schematically. In FIGS. 7 and 8, and also in FIGS. 13 and 14, there are shown reversing mechanisms that deflect the thrust upwardly only. The patent is directed toward deflector plates positioned in the thrust reverser to prevent backflow into the bypass passageway.

U.S. Pat. No. 3,691,711 (Colley) discloses a thrust reverser where a plurality of blocker flaps 32 pivot radially inwardly to block the fan duct passageway of a fan duct engine, with the flow being deflected radially outwardly through the vanes 56 in a forward direction. (This arrangement is similar to the first five patents noted above.)

U.S. Pat. No. 3,779,010 (Chamay et al) shows a thrust reverser where the aft section of the engine translates rearwardly to uncover a plurality of guide vanes which extend around the nozzle of the engine. This also causes a plurality of blocker flaps 70, which are pivotally mounted to the translating portion of the cowling, to move inwardly to a blocking position. A number of struts 86 interconnect the blocker flaps 70 with the engine casing 20. It is stated that this casing 20 could either house a conventional core engine, or it could be the plug of a core engine.

U.S. Pat. No. 3,844,482 (Stearns) shows a clam shell thrust reverser for an engine which is shown mounted directly to the wing. The clam shell panel 26 is pivotally mounted about a lower axis and rotates rearwardly and upwardly into its blocking position. An aft ramp segment 54 is pivotally mounted at a forward location at 48 and is rotated upwardly to block the rear opening of the clam shell panel 26 so that the exhaust flows into the clam shell panel 26 and is deflected forwardly and upwardly for thrust reversal.

U.S. Pat. No. 3,915,415 (Pazmany) shows a thrust reverser used on a wing mounted jet engine where the exhaust gases are discharged over the upper surface of the wing. The nacelle has an aft section 24 with a target blocker door 28 which is moved rearwardly and downwardly onto the upper surface of the wing into its thrust reversing position. A set of vanes is moved rearwardly toward the upper edge of the blocker door to deflect the exhaust gases upwardly and forwardly.

U.S. Pat. No. 3,917,198 (Sanders) shows a thrust reverser for a jet engine mounted to a wing where the exhaust gases are discharged over the upper surface of the wing. There is a deflector door 24 positioned at the aft end of the engine, and this is rotated upwardly and rearwardly to its thrust reversing position. The blocker door 22 has its forward edge moved rearwardly which, in turn, by the action of the linkage 48 moves the blocker door 22 upwardly into its blocking position to cooperate with the deflector door 24 to cause upward and forward deflection of the jet exhaust.

U.S. Pat. No. 3,981,463 (Pazmany) shows another thrust reverser for use in an engine mounted directly to a wing so as to discharge its exhaust over the upper surface of the wing. There is a blocker door 20 which is pivotally mounted at its forward end of the upper surface of the wing for movement upwardly and forwardly to its blocking position. A deflector door 30 is pivotally mounted at its rear end and movable upwardly and rearwardly to its thrust reversing position.

U.S. Pat No. 4,073,440 (Hapke) shows a thrust reverser to reverse the thrust of both the primary and fan air. In some embodiments, blocker doors are arranged to be moved from a stowed position adjacent the inner circumferential wall defining the inside of the fan duct radially outwardly to a thrust reversal position, with the air flow through the fan duct being diverted radially outwardly through cascade vanes which are exposed by rearwardly translating an aft portion of the nacelle rearwardly. In some arrangements, blocker doors are also provided to move to a deployed position to divert the flow from the primary exhaust radially outwardly through cascade vanes, and in other arrangements, the primary flow is closed off, thus permitting the primary exhaust to exit through the nozzle through which the fan air is normally discharged.

U.S. Pat. No. 4,183,478 (Rudolph) shows a thrust reverser where in one embodiment there is a single clam shell door used in an engine which is mounted to the wing, with the exhaust being directed over the top surface of the wing. The door is slide mounted at a forward location, and is mounted by a pivot link at a rear location, this causing the door to have a rearward and angular movement to its thrust reversing position. Movement of the door exposes a set of cascade vanes. In another embodiment, two such clam shell doors are shown in an axisymmetric exhaust system.

SUMMARY OF THE INVENTION

The jet engine and thrust reversing assembly of the present invention is particularly adapted to be incorporated in a fan jet engine having a long fan duct structure, but within the broader scope of the present invention, could be used in other applications. The assembly has a forward end and a rear end.

In the preferred form, there is a core engine having an intake end and an exhaust end from which primary exhaust is discharged into an exhaust area. There is a fan duct structure having an annular rear end portion and defining an annular secondary air passageway which is positioned around the core engine and which exhausts secondary air into the exhaust area. There is fan means to blow fan air through the secondary air passageway.

The thrust reversing subassembly of the invention comprises an annular thrust diverting structure having a cruise position and a thrust reversing position. It comprises a circumferential side wall which in the cruise position extends substantially entirely around the exhaust area, with a forward annular end portion of the thrust diverting structure being positioned adjacent to an annular rear end portion of the fan duct structure so as to form a rearward extension of the fan duct structure and to define a rear exhaust passageway portion from which the primary exhaust and air from the secondary passageway are discharged.

The thrust diverting structure is movable rearwardly from the cruise portion to the thrust reversing position where at least one portion of the forward annular end portion of the thrust diverting structure is spaced rearwardly from the annular rear end portion of the fan duct structure to form a laterally directed thrust diverting opening.

There is a passageway blocking plate means which in the cruise position is located to permit flow through the rear exhaust passageway portion and in the thrust reversing position blocks flow through the rear exhaust passageway portion to create with the thrust reversing structure a flow diverting region to cause the primary exhaust and the fan air to flow through the thrust reversing opening to create a reverse thrust.

In this preferred configuration, the assembly is characterized in that the lateral and longitudinal thrust reversing loads exerted on the thrust reversing subassembly are transmitted into the fan duct structure which is arranged to in turn transmit these thrust reversing loads into other structure to which the jet engine and thrust reversing assembly are mounted.

In the preferred form, there are vane manes which, with the thrust diverting structure in the thrust reversing position, is positioned in the thrust reversing opening to properly direct flow through the thrust reversing opening. Also in the preferred form, the thrust diverting structure is pivotally mounted to the fan duct structure at a lower location so that the thrust diverting structure rotates with a downward component of motion to the thrust reversing position, so that the thrust diverting opening is directed upwardly. The thrust diverting structure has opening means to receive the vane means when the thrust diverting structure is in the cruise position.

Also, in the preferred configuration, the fan duct structure has lower rear wall sections having upper edge portions to which the vane means is mounted. Further, the thrust diverting structure has lower forward wall sections which in the cruise position overlap with the lower rear wall sections of the fan duct structure, and in the thrust reversing position form with the lower rear wall sections an enclosure wall means to define a lower portion of the thrust reversing region.

Desirably, the blocking plate means is pivotally mounted at a location in the thrust reversing structure, and in the cruise configuration is aerodynamically aligned with flow through the rear exhaust passageway portion, and is rotated to the thrust reversing position where the blocking plate means extends transversely across the thrust diverting structure. Specifically, the plate means is pivotally mounted to the thrust diverting structure so as to be movable therewith between the cruise position and the thrust reversing position.

There is blocking plate actuating means operatively connected between the blocking plate means and other structure in the assembly which is not movable with the thrust diverting structure in moving to the thrust reversing position. The actuating means is arranged to respond to relative movement between the thrust diverting structure and said other structure to rotate the blocking plate means between the cruise position and the thrust reversing position. Specifically, the actuating means comprises linkage means connecting to the blocking plate means at a location spaced from an axis of rotation about which said blocking plate means rotates between the cruise position and the thrust reversing position.

In the preferred arrangement, the other structure to which the linkage means is connected comprises a structure of the core engine, which is specifically a nozzle plug of the core engine. As an additional feature, the blocking plate means has locking structure to interfit in locking relationship with the nozzle plug when the blocking plate means is in the cruise configuration. This prevents rotation of the blocking plate means, but the locking structure become disengaged from the nozzle plug when the thrust diverting structure moves toward the thrust reversing position.

One preferred arrangement of the assembly of the present invention is for the engine to be mounted below and forwardly of a wing, with the thrust reversing subassembly being arranged to discharge the thrust reversing flow upwardly at a location forwardly of the wing. Also, in a preferred configuration, the engine is mounted by means of a strut which extends downwardly and laterally outwardly from the wing, with the thrust reversing flow being discharged at a location laterally of the strut. In this preferred configuration, the thrust reversing flow is directed upwardly and laterally outwardly, and the thrust diverting structure is pivotally mounted about a hinge axis positioned at a lower and laterally inward location in the engine and thrust reversing assembly.

Other features will become apparent from the following detailed description.

BRIEF DESCRIPTION OF THE DRAWINGS

FIG. 1 is a front elevational view of an airplane incorporating the engine and thrust reversing assembly of the present invention;

FIG. 2 is a side view of the engine and thrust reversing assembly;

FIG. 3 is a longitudinal sectional view taken along the longitudinal center axis of the engine, showing the aft portion of the engine and the thrust reversing subassembly in the cruise configuration;

FIG. 15 is a isometric view taken from a location laterally outward of the invention in its thrust reversing position.

DESCRIPTION OF THE PREFERRED EMBODIMENT

Figure 4:
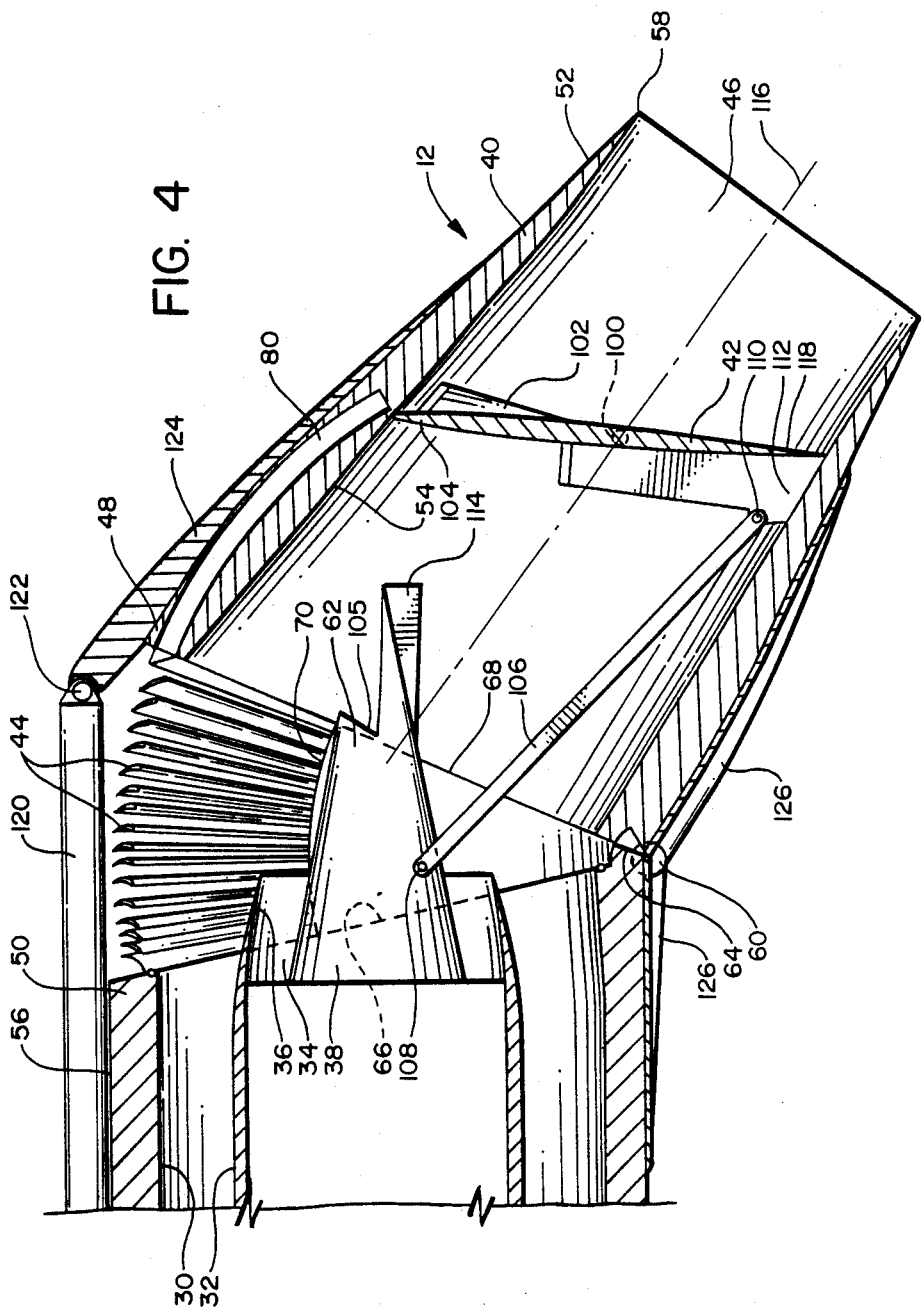
FIG. 4 is a view similar to FIG. 3, but showing the thrust reversing subassembly in the thrust reverser position.

The engine 10 incorporating the thrust reversing system 12 of the present invention is, in this preferred embodiment, a long duct fan jet engine having a front inlet 14, a rear exhaust end 16 and a longitudinal center axis 18. In the particular arrangement shown herein, the engine 10 is mounted beneath, and forwardly of, a wing 20 by means of a mounting strut 22. Since in this preferred form the thrust reversal system 12 in its thrust reversing mode of operation directs the gaseous exhaust from the engine upwardly and forwardly at a location forwardly of the wing's leading edge, the strut 22 is positioned so that it extends from the lower forward portion of the wing downwardly and laterally outwardly at an angle of about 45 degrees from the vertical.

As can be seen in FIG. 2, the engine comprises an outer nacelle structure or fan duct structure 24 and a core engine 26. This core engine is, or may be, in and of itself of conventional design, comprising a forward compressor section 26a, a rear turbine section 26b, and an intermediate gas generating section 26c. The fan (not shown for ease of illustration) is mounted within the forward end of the fan jet structure 24, with the fan exhaust being discharged through the annular fan passageway 28, defined by the inner surface 30 of the fan jet structure 24 and the outer surface 32 of the core engine 26. The core engine 26 has an annular exhaust passageway 34 defined by a peripheral exhaust nozzle 36 and an end plug 38.

The thrust reversing assembly 12 of the present invention comprises three main components, namely an end flow or thrust diverting structure 40, a blocking plate 42 which is pivotally mounted in the end structure 40, and a set of turning vanes 44 mounted at the upper rear portion of the nacelle structure 24. The thrust reversing assembly 12 has a cruise position (illustrated in FIG. 3), and a thrust reversing position shown in FIGS. 4 and 15.

In the cruise configuration, the end structure 40 is simply a rearward extension of the outer nacelle structure 24 defining an exhaust passageway 46 through which the bypass air from the fan passageway 28 and the exhaust from the core engine 26 are exhausted. Thus, the end structure 40 has a forward end portion 48 which, in the cruise configuration, is positioned adjacent to a rear end portion 50 of the nacelle structure 24 so that the outer and inner surfaces 52 and 54 of the end structure 40 form with the outer surface 56 and inner surface 30 of the nacelle structure 24, respectively, continuous aerodynamically aligned surfaces which terminate at a rear circumferential edge 58 defining a rear exhaust nozzle.

The end structure 40 is pivotally mounted at its lower front edge to the lower rear end of the nacelle structure 24 by means of a pair of hinge mounts 60 for movement about a transverse axis. For purposes of description, the terms "lower" and "upper" will be used to refer to the location of the axis of rotation of the hinge mounts 60. The hinge mounting at 60 is positioned a moderate distance laterally in an inboard direction from the lowermost location of the engine 10. Thus, the hinge mounting at 60 is not truly at the lowermost location, but for facility of description, it will be considered as being the lowermost location, while the term "upper" shall be used to denote a location diametrically opposite to the hinge locations 60. Further, as can be seen in FIGS. 3 and 4, and also in FIG. 15 in moving from the cruise position of FIG. 3 to the thrust reversing position of FIG. 4, the end thrust diverting structure 40 rotates rearwardly and downwardly through about 35 to 40 degrees of travel to the thrust reversing position of FIG. 4.

Figure 10:
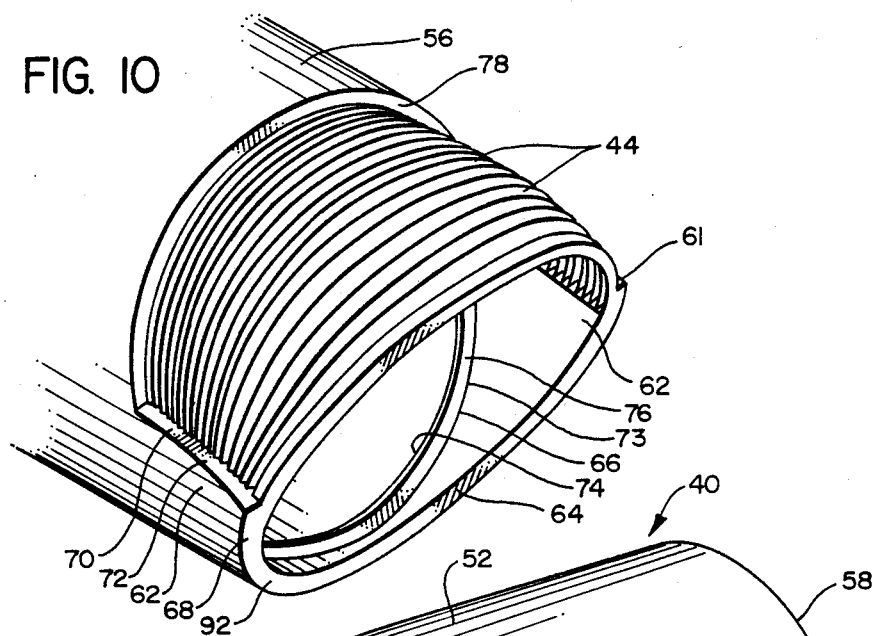
FIG. 10 is an isometric view similar to FIG. 8, but showing the entire aft portion of the fan duct structure and the vanes.

The aforementioned turning vanes 44 comprise a plurality of individual vanes which are transversely aligned in a semi-circular configuration, with the vanes 44 being spaced from one another in a forward-to-rear direction. (See FIG. 10.) Thus, the configuration of the vanes 44 collectively is that of half of a torus which is essentially a rearward extension of the upper half of the nacelle or fan duct structure 24. The vanes 44 and the thrust reversing end structure 40 are configured relative to one another so that in the cruise configuration of FIG. 3, the upper forward portion of the end structure 40 completely encloses the vanes 44, while in the thrust reversing position at FIG. 4, the vanes 44 are totally exposed.

Figure 8:
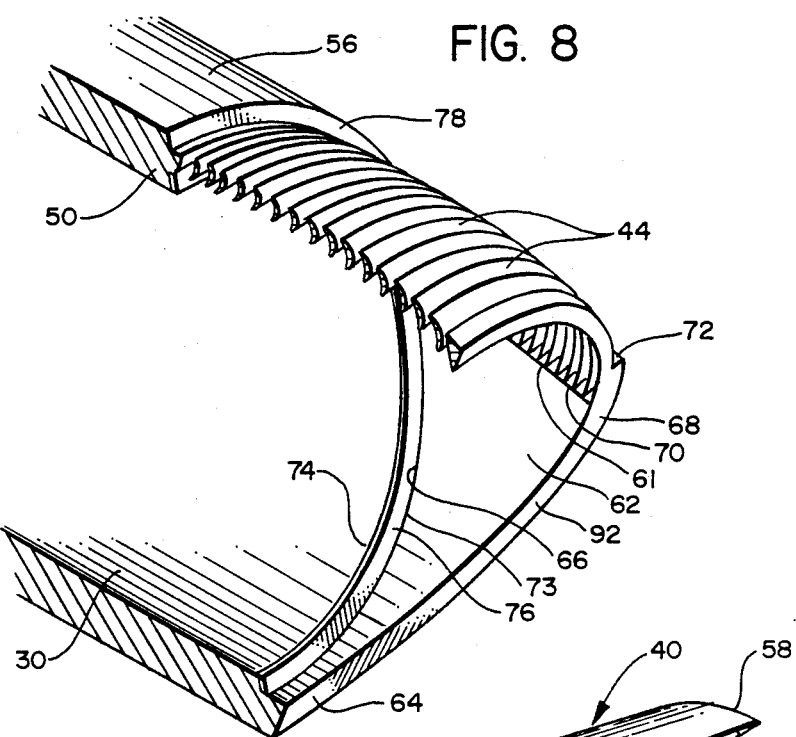
FIG. 8 is an isometric view showing a half section of the aft portion of the fan duct structure alone, carrying the turning vanes of the thrust reversing subassembly.

The lower side edges of the vanes 44 are fixedly connected to an upper edge of two rearward extensions 62 of the lower end portion of the fan duct structure 24. (See FIGS. 8 and 10.) These rearward extensions 62 serve two functions. In addition to performing the first function of providing a lower end mounting connection for the vanes 44 when the end structure 40 is in the thrust reversing position, the extensions 62 form with the lower part of the thrust diverting end structure 40 a lower enclosed structure to enhance the upward and forward flow of the gaseous exhaust from the engine 10. More specifically, these rearward extensions 62 each have the configuration of a sector of a circle (i.e. a "pie shaped" configuration), with a lower apex end 64, forward and rear upwardly and outwardly diverging edge portions 66 and 68, respectively, and an upper arcuately curved edge 70, and with the sector being curved from the apex portion 64 to the curved edge 70 so as to follow the curvature of the fan duct structure 24. The edge portion 68 is actually a rearwardly facing surface portion of the extension 62.

It will be noted that the upper arcuately curved edge 70 of each extension 62, in addition to supporting the vanes 44, forms a shoulder or step 72 positioned outwardly of the vanes 44. (See FIGS. 8 and 10.) Further, the forward inner edge portion 73 (see FIG. 8) of the forward edge 66 of each extension 62 is spaced moderately radially outwardly of a rear inner edge portion 74 of the fan duct structure 24 so as to form an annular rearwardly facing surface where there is positioned a circumferential seal 76. This seal 76 extends upwardly along each edge portion 73 of the two extensions 62 and thence upwardly along the rear edge of the fan duct structure 24 adjacent to the most forward location of the vanes 44. Also, the upper rear portion of the fan duct structure 24 has a semicircular rearwardly facing shoulder or surface 78 having a semicircular configuration and being spaced radially outwardly of the most forward vane 44. These surfaces 72, 68 and 78, and also the seal 76 are arranged to come into proper engagement with corresponding surfaces in the end thrust reversing structure 40, as will be described below.

Figure 9:
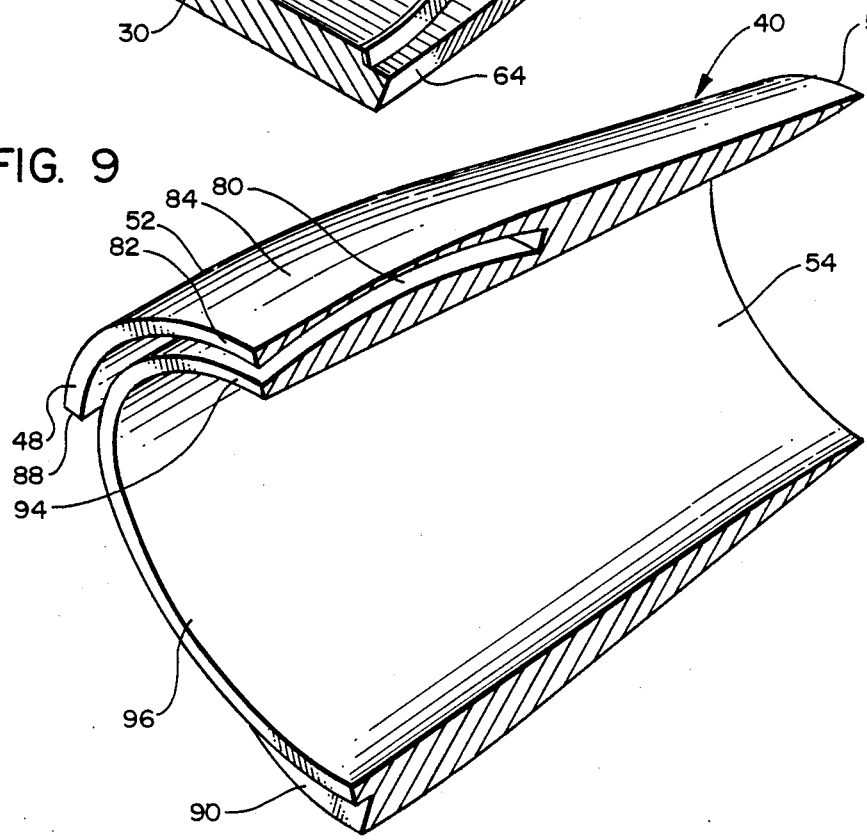
FIG. 9 is an isometric view similar to FIG. 8, showing a half section of only the thrust diverting structure of the thrust reversing subassembly.
Figure 11:
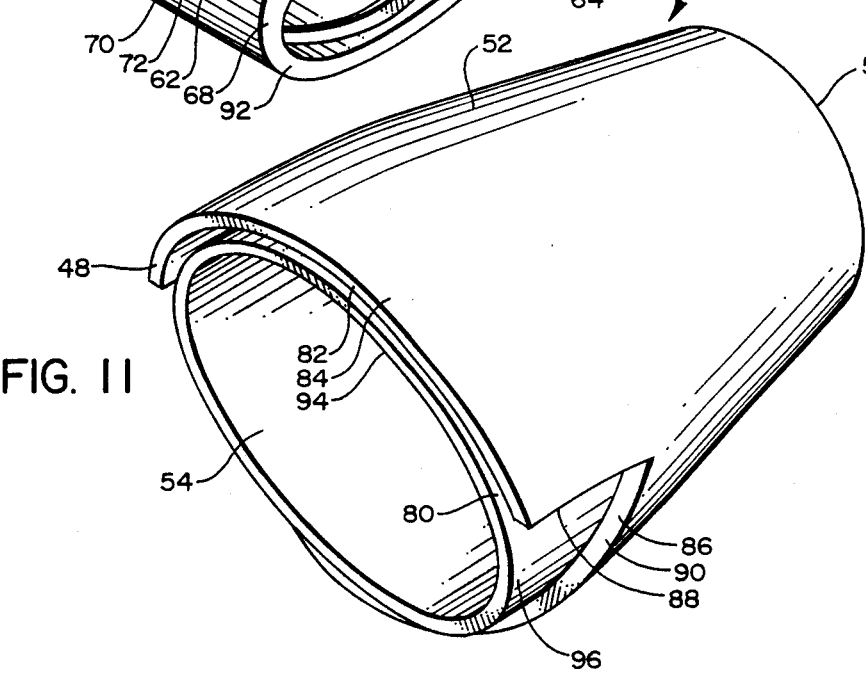
FIG. 11 is a view similar to FIG. 9, but showing only the thrust diverting structure fully.

With reference to FIGS. 9 and 11, it can be seen that the forward upper portion of the thrust reversing structure 40 has a semicircular slot 80 which is curved in a forward to rear direction to match the forward to rear curvature of a curved plane defined by the vanes 44, with the curvature of the vanes 44 and of the slot 80 having the hinge location 60 as a center of curvature. The forward radially outward edge portion of the end structure 40 has a semicircular forwardly facing surface 82 which in the cruise configuration is positioned against the semicircular surface 78 of the end structure 40. Then the wall portion 84 which is positioned below the slot 80 has two sector-shaped cutout areas 86 defined by an upper downwardly facing surface 88 and a forwardly facing surface 90. In the cruise configuration, the downwardly facing surface 88 is in engagement with the surface 72 of the each rear extension 62, while the forward facing surface 90 is in engagement with a matching surface 92 at the rear edge 68 of the related extension 62. Further, the forward edge portion of the thrust reversing structure 40 has at a location radially inwardly of the slot 80 a forwardly facing annular surface 94 which, in the cruise configuration, fits against the seal 76 so as to prevent leakage of any of the exhaust or fan air at the location of the seal 76.

Figure 5:
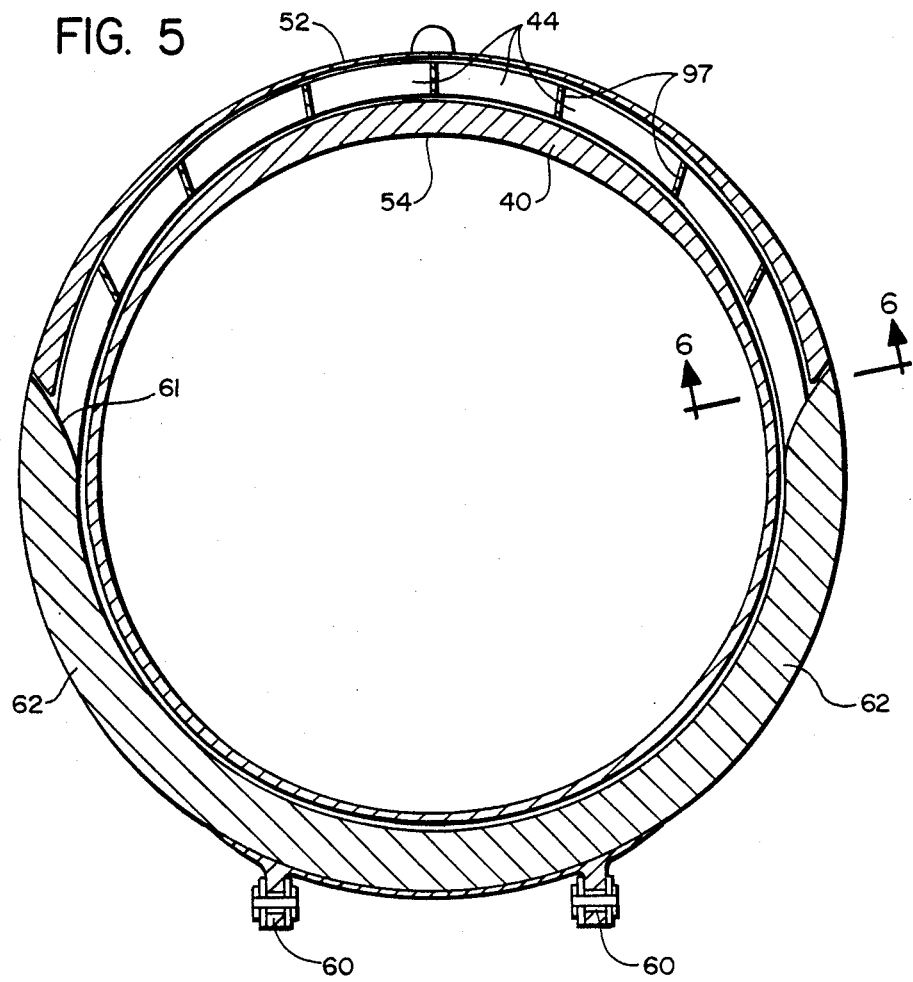
FIG. 5 is a transverse sectional view taken along line 5—5 of FIG. 3.
Figure 6:
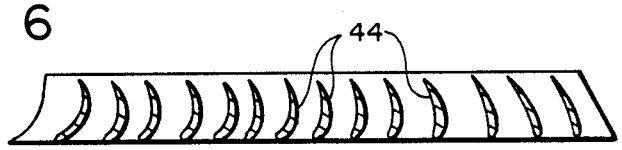
FIG. 6 is a sectional view taken along line 6—6 of FIG. 5.
Figure 7:
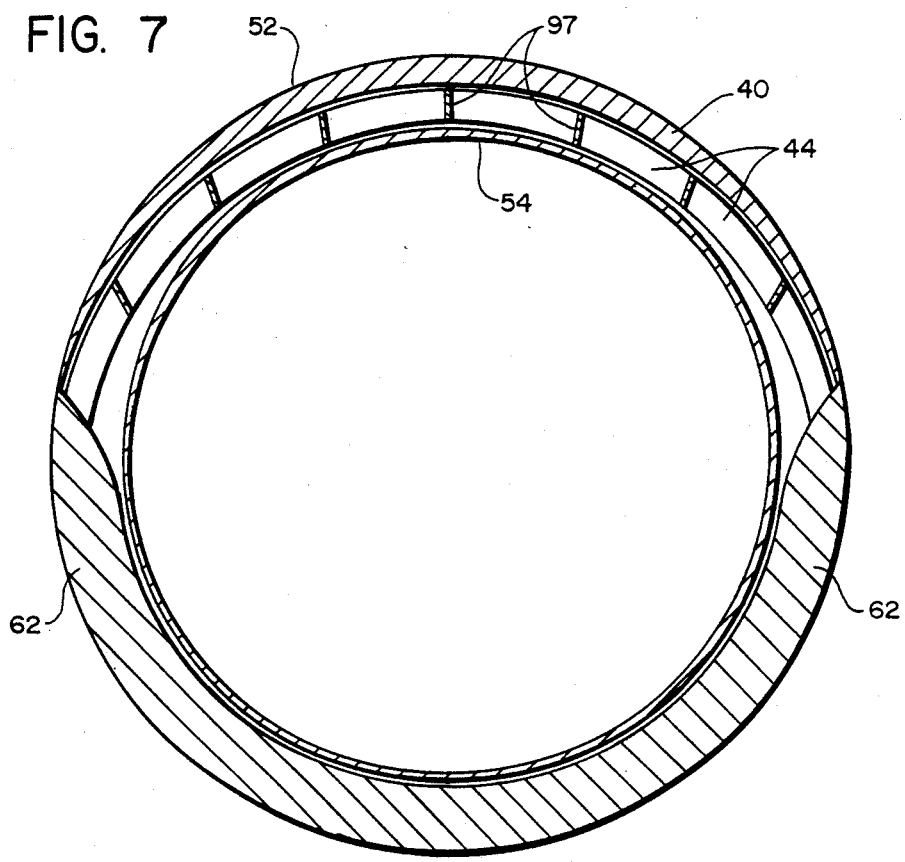
FIG. 7 is a transverse sectional view taken along line 7—7 of FIG. 3.

Thus, it can be appreciated that in the cruise configuration, the vanes 44 remain positioned within the slot 80, and the forwardly facing surface 82 fits against the surface 78 of the fan duct structure 24, the surface 90 fits against the rearwardly facing surface 92 of each extension 62, and the surfaces 88 and 72 fit against one another. Further, the annular surface 94 fits snugly against the seal 76, and the sector-shaped extensions 62 fit into related cutout areas 86 so as to overlap matching sector-shaped portions 96 of the thrust reversing end structure 40. The vanes 44 are desirably interconnected by longitudinally extending bracing members 97 (see FIGS. 5 and 7).

Then, when the end thrust reversing structure 40 is rotated to its thrust reversing position of FIG. 4 and FIG. 15, the vanes 44 become exposed, but the area immediately below the vanes 44 remains closed. More particularly, the lower wall portions 96 of the thrust reversing structure 40 have at the forward edge portions thereof a small amount of overlap with the sector-shaped extensions 62 so as to form, in effect, a substantially closed lower wall structure, which with the blocking plate 42 form a flow diverting region where the flow from the core engine and the fan are diverted upwardly and forwardly through the opening in which the vanes 44 are located.

The aforementioned blocking plate 42 is pivotally mounted to the flow diverting end structure 40 about a transverse horizontal axis 100 at about the mid height of the end structure 40. In the cruise configuration of FIG. 3, the blocking plate 42 is horizontally aligned and aerodynamically contoured so as to provide minimum resistance to the gaseous exhaust which flows both above and below the blocking plate 42. In plan view, the plate 42 has a nearly circular configuration, but is lengthened a small amount in a forward-to-rear direction so that the blocking plate 42 properly fits within the end structure 40 in its blocking position. In the particular configuration shown herein, an end portion 102 of the end plug 38 of the core engine 26 is made separable from the main plug 38 and is fixedly connected to the forward end portion 104 of the plate 42 so as to be movable therewith. More particularly, the plug end portion 102 fits against the plug 34 along a plane 105 which has an upward and rearward slant. Thus, it can be seen with reference to FIG. 3 that with the end structure 40 in the cruise position, the movable plug end portion 102 which is fixed to the blocking plate 42 fits in a slot within the plug 38 so as to prevent any upward or downward pivoting movement of the plate 42. If desired this plug end portion 102 can be extended rearwardly to the rear end of the plate 42.

To properly move the blocking plate 42 between its cruise position at FIG. 3 and its blocking position of FIG. 4, there is provided a locating link 106 pivotally connected at its forward end 108 to the core engine plug 38, and pivotally connected at its rear end at 110 to a structural member 112 fixedly connected to and extending downwardly from the aft portion 114 of the blocking plate 42. This member 112 is aerodynamically contoured and is, in effect, an aerodynamic extension of a "V" shaped member 114 extending rearwardly from the lower rear end of the plug 38. Thus, in the cruise configuration of FIG. 3, these members 112 and 114 form a continuous aerodynamically contoured structure. It is to be understood that the locating link 106 can comprise a pair of these links positioned on opposite sides of the plug 38.

The forward connecting location 108 of the link 106 is above the hinge axis defined by the hinge mounts 60 for the end structure 40, and the rear link connection 110 is positioned rearwardly of the pivot axis 100 for the blocking plate 42, with a line passing through the connecting locations 108 and 110 being below the axis of rotation 100 of the plate 42. Thus, the locating link 106 is arranged, relative to the pivoting movement of the end structure 40, so that as the end structure 40 moves from the cruise position of FIG. 3 to the thrust reversing position of FIG. 4, the blocking plate 42 is caused to move from its horizontally extending cruise position in a clockwise direction (as seen in FIGS. 3 and 4) to the blocking position of FIG. 4.

In the blocking position of FIG. 4, the blocking plate 42 extends entirely across the opening defined by the end structure 40, but the plate is not perpendicular to a forward-to-rear center axis 116 of the end structure 40. Also, the forward end portion 104 of the plate 42 is, relative to a forward-to-rear center axis 116 of the end structure 40, to moderate distance forward of the rear end 118 of the blocking plate 42.

To move the thrust reversing structure 40 between its cruise and thrust reversing positions, there is provided an hydraulic actuator 120 connected to the fan duct structure 24 at a forward location 121 (see FIG. 15) and connected at a rear location 122 to a fairing structure 124 which in turn fixedly connected to the top part of the thrust reversing structure 40. Also, it is to be understood that fairing can be provided to enclose the actuator 120. Further, it is to be understood that a suitable fairing 126 (shown somewhat schematically in FIGS. 3 and 4) can be used to enclose the hinge mounts 60.

Figure 12:
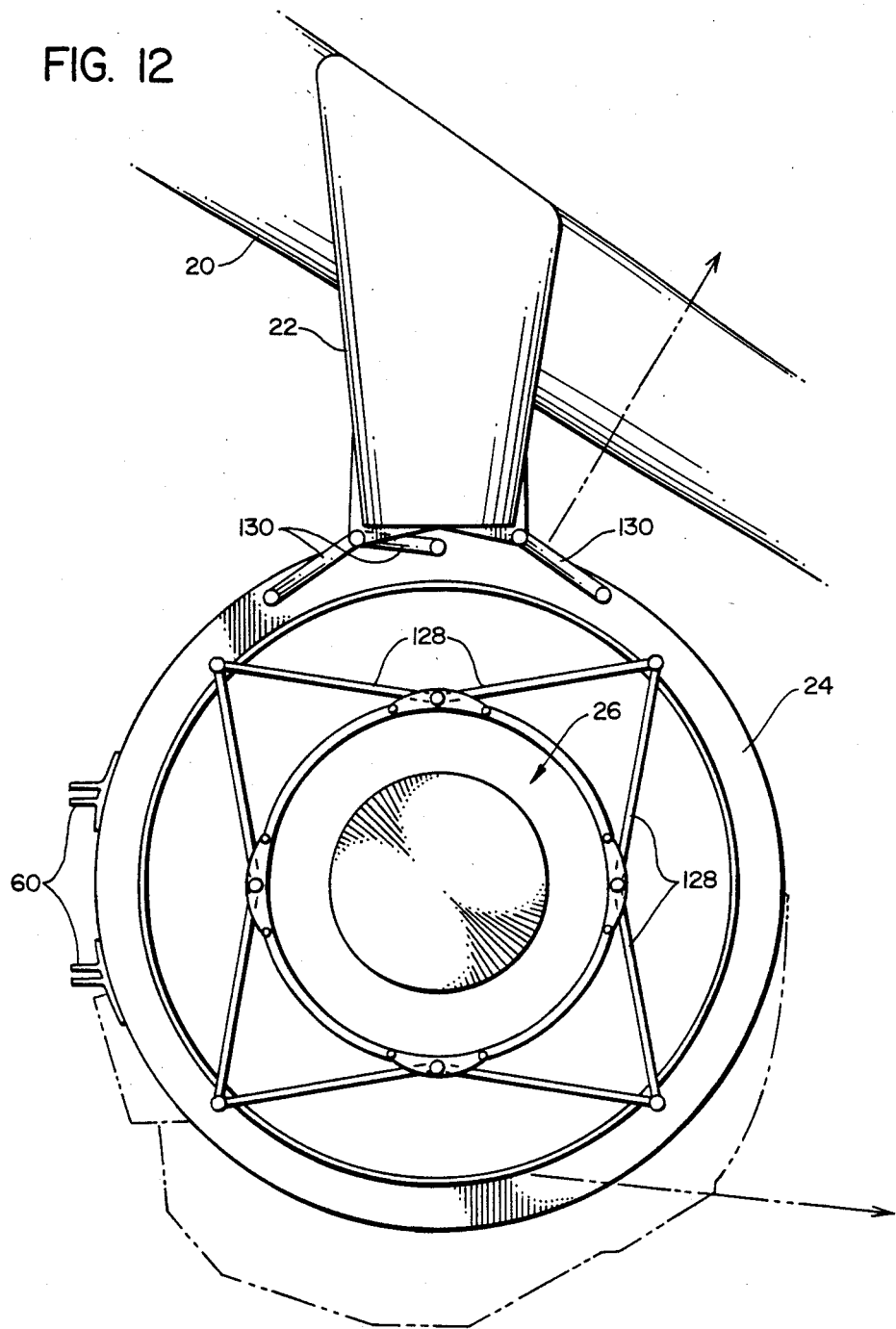
FIG. 12 is a transverse sectional view taken at a forward portion of the engine, looking in a rearward direction, and illustrating certain load carrying links by which the core engine and fan case are supported.
Figure 13:
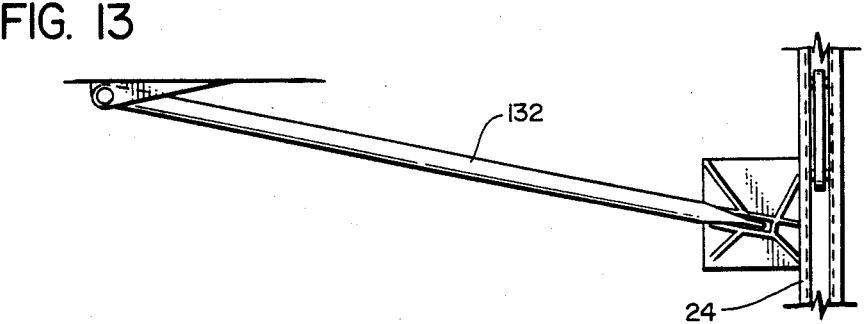
FIG. 13 is a top view of one of the thrust links interconnecting the engine to support structure.
Figure 14:
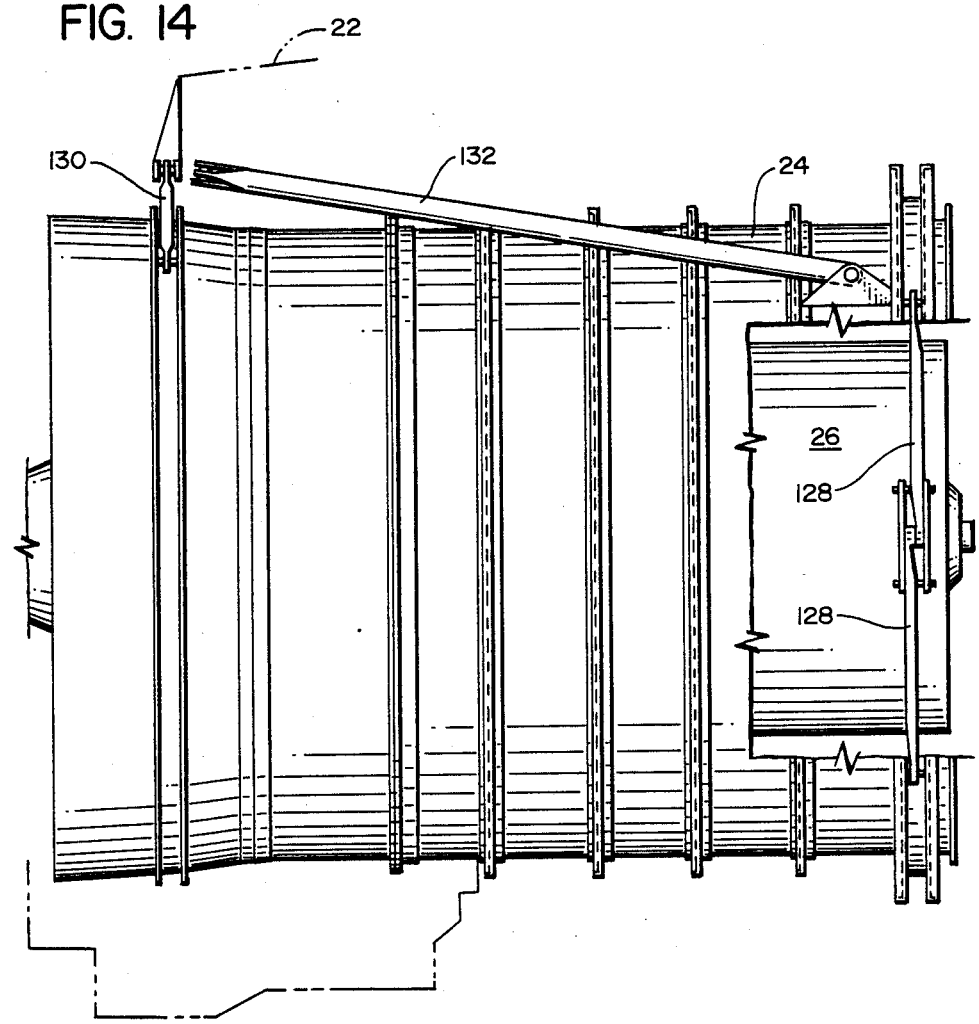
FIG. 14 is a side elevational view of the fan duct structure with portions thereof being removed to show a portion of the core engine to show the support and thrust links.

To discuss another facet of the present invention, reference is made to FIGS. 12, 13 and 14. The fan duct structure 24 is constructed as a primary load carrying member to react the loads from the thrust reverser assembly 12 directly into structure in the strut 22. Also, the loads developed by the core engine 26 are transmitted directly into the fan duct structure 24 and then into the structure of strut 22. Since the manner in which the structural components can be arranged to transmit these loads, as described above, are well known in the prior art, these will be discussed only briefly herein, and no attempt will be made to present a full description of such components.

With reference to FIG. 12, there is shown a forward portion of the core engine 26 being mounted by a plurality of struts 128 to react the transverse loads and the torsional loads of the core engine 26 into the fan duct structure 24. Further, there is shown a second set of struts or links 130 to react these loads into the structure of the strut 22.

As shown in FIGS. 13 and 14, there is a set of main thrust links 132 connected between the structure of the strut 22 and the fan duct structure 24. This is to transmit the thrust loads developed during thrust reversing mode of operation directly from the fan duct structure 24 into the structure of the strut 22. With regard to the thrust loads developed by the core engine 26, there can be provided thrust links between the core engine 26 and the fan duct structure 24. Alternatively, there can be a thrust link connection directly from the core engine 26 to the structure of the strut 22. Since the manner in which this can be done is well known in the prior art, for convenience this is not illustrated herein.

To describe the operation of the present invention, in the cruise position of FIG. 3, the thrust reversing structure 12 is positioned so as to function simply as a rearward extension of the fan duct structure 24 so as to provide the rear exhaust passageway portion terminating in the exhaust nozzle defined by the rear circumferential edge 58. In this position, the blocking plate 42 is aligned with the direction of flow, and is also contoured so as to minimize any drag. As indicated previously, the forward portion 104 of the blocking plate 42 has fixidly connected thereto an end portion 102 of the plug 38, with this end portion 102 having a slanted engagement plane 105 with the plug 38, so that in the cruise position, the plate 42 is fixidly held in engagement with the plug 38. To place the thrust reversing assembly in its thrust reversing position, the actuator 120 is extended to cause the end thrust reversing structure 40 to rotate rearwardly about the lower transverse axis of the hinges 60. When this occurs, the upper forward portion of the structure 40 moves so as to uncover the vanes 44. However, the lower sector-shaped rear extensions 62 of the fan duct structure 24 remain in at least partial overlapping relationship with matching lower wall portions 96 of the thrust reversing structure 40 so as to form a substantially closed lower wall portion beneath the vanes 44.

As the thrust reversing structure 40 moves rearwardly, the action of the link or links 106 causes the blocking plate 42 to rotate about its horizontal center axis 100 to the blocking position of FIG. 4. Thus, it can be seen with reference to FIG. 4 that the area rearwardly of the primary exhaust passageway 34 and the fan duct passageway 28 is substantially closed except for the area occupied by the vanes 44, so as to create the flow diverting region. Thus, the primary exhaust and the fan air move upwardly through the vanes 44, with the vanes 44 directing the flow in an upward, laterally outward and forward direction to cause thrust reversal.

Since the flow from the engine is not directed symmetrically, relative to the center axis of the engine, there is developed a substantial lateral force at the location of the thrust reversing assembly 12. The lateral and longitudinal loads developed during thrust reversal are transmitted from the thrust reversing assembly 12 directly into the fan duct case or structure 24 to be then transmitted to the structure of the strut 22.

At the end of the thrust reversing mode of operation, the actuator 120 is retracted to return the thrust reversing end structure 40 to the cruise configuration of FIG. 3, with the plate 42 returning to its horizontally aligned cruise configuration.

It should be noted that this thrust reversal assembly 12 comprises essentially four main moving components, namely the thrust reversing end structure 40, the blocking plate 42, the link 106 and the actuator 120. Further, these are simple hinged components, which results in low maintenance costs and efforts.

The gaseous exhaust from the engine is directed in large part upwardly, and to some extent laterally, thus avoiding the blowing of dirt into the engine inlet and also avoiding reingestion of the engine exhaust. Further, the downward thrust in the thrust reversing mode counteracts lift. Also, the thrust reversing components are arranged so that the relatively high temperature from the core engine is cooled by the fan blow, thus alleviating hot part complexity and maintenance.

It is to be understood that various modifications could be made without departing from the basic teachings of the present invention.

What is claimed is:

1. A jet engine and thrust reversing assembly having a forward end and a rear end, said assembly comprising:
   a. a core engine having an intake end and an exhaust end from which the primary exhaust is discharged into an exhaust area;
   b. a fan duct structure having an annular rear end portion and defining an annular secondary air passageway which is positioned around the core engine and which exhausts secondary air into said exhaust area;
   c. fan means to blow fan air though said secondary air passageway;
   d. a thrust reversing subassembly comprising:
      i. an annular thrust diverting structure having a cruise position and a thrust reversing position, said thrust reversing structure comprising a circumferential side wall which in the cruise position extends substantially entirely around said exhaust area, with a forward annular end portion of said thrust diverting structure being positioned adjacent to the annular rear end portion of the fan duct structure so as to form a rearward extension of said fan duct structure and to define a rear exhaust passageway portion from which the primary exhaust and the air from the secondary passageway are discharged, said thrust diverting structure being movable rearwardly from the cruise position to the thrust reversing position where at least one portion of the forward annular end portion of the thrust diverting structure is spaced rearwardly from the annular rear end portion of the fan duct structure to form a laterally directed thrust diverting opening; and
      ii. passageway blocking plate means which in the cruise position is located to permit flow through the rear exhaust passageway portion and in the thrust reversing position blocks flow through the rear exhaust passageway portion to create with the thrust diverting structure a flow diverting region to cause the primary exhaust and the fan air to flow through the thrust reversing opening to create a reverse thrust;
   e. said assembly being characterized in that lateral and longitudinal thrust reversing loads exerted on said thrust reversing subassembly are transmitted into said fan duct structure which is arranged to in turn transmit said thrust reversing loads into other structure to which the jet engine and thrust reversing assembly is mounted;
   f. vane means which, with the thrust diverting structure in said thrust reversing position, is positioned in said thrust reversing opening to properly direct flow through the thrust reversing opening;
   g. said thrust diverting structure being pivotally mounted to said fan duct structure at a lower location so that the thrust diverting structure rotates with a downward component of motion to the thrust reversing position, so that the thrust diverting opening is directed upwardly.

2. The assembly as recited in claim 1, wherein said thrust diverting structure has opening means to receive said van means when the thrust diverting structure is in said cruise position.

3. The assembly as recited in claim 2, wherein the fan duct structure has lower rear wall sections having upper edge portions to which said vane means is mounted.

4. The assembly as recited in claim 3, wherein the thrust diverting structure has lower forward wall sections which in the cruise position overlap the lower rear wall sections of the fan duct structure, and in the thrust reversing position form with the lower rear wall sections an enclosure wall means to define a lower portion of said thrust reversing region.

5. The assembly as recited in claim 4, wherein said blocking plate means is pivotally mounted at a location in said thrust diverting structure, and in the cruise configuration is aerodynamically aligned with flow through said rear exhaust passageway portion, and is rotated to the thrust reversing position where said blocking plate means extends transversely across said thrust diverting structure.

6. The assembly as recited in claim 5, wherein said blocking plate means is pivotally mounted to said thrust diverting structure so as to be movable therewith between the cruise position and the thrust reversing position.

7. The assembly as recited in claim 6, wherein there is blocking plate actuating means operatively connected between said blocking plate means and other structure in said assembly which is not movable with said thrust diverting structure in moving to the thrust reversing position, with said actuating means being arranged to respond to relative movement between said thrust diverting structure and said other structure to rotate said blocking plate means between the cruise position and the thrust reversing position.

8. The assembly as recited in claim 7, wherein said actuating means comprises linkage means connecting to said blocking plate means at a location spaced from an axis of rotation about which said blocking plate means rotates between the cruise position and the thrust reversing position.

9. The assembly as recited in claim 8, wherein said other structure to which the actuating means is connected comprises structure of said core engine.

10. The assembly as recited in claim 9, wherein said actuating means is connected to a nozzle plug of said core engine.

11. The assembly as recited in claim 10, wherein said blocking plate means has locking structure to interfit in locking relationship with said nozzle plug when the blocking plate means is in said cruise configuration, so as to prevent rotation of said blocking plate means in the cruise position, with said locking structure becoming disengaged from said nozzle plug when said thrust diverting structure moves toward the thrust reversing position.

12. The assembly as recited in claim 1, wherein said assembly is mounted at a location below and forwardly of a wing, with said thrust reversing subassembly being positioned, relative to the wing, to direct flow through the thrust reversing opening in an upward direction forwardly of a leading edge of the wing.

13. The assembly as recited in claim 12, wherein said assembly is mounted from said wing by strut means which extend from said wing downwardly and at a slant in an outward direction, and said subassembly is arranged to direct said thrust reversing flow laterally of said strut means in an upward and outward slanted direction.

14. The assembly as recited in claim 1, wherein:
   a. said thrust diverting structure is pivotally mounted to said fan duct structure at a lower location so that the thrust diverting structure rotates with a downward component of motion to the thrust reversing position, so that the thrust diverting opening is directed upwardly;
   b. the fan duct structure has lower rear wall sections having upper edge portions to which said vane means is mounted; and
   c. the thrust diverting structure has lower forward wall sections which in the cruise position overlap the lower rear wall sections of the fan duct structure, and in the thrust reversing position form with the lower rear wall sections an enclosure wall means to define a lower portion of said thrust reversing region.

15. The assembly as recited in claim 1, wherein said blocking plate means is pivotally mounted at a location in said thrust diverting structure, and in the cruise configuration is aerodynamically aligned with flow through said rear exhaust passageway portion, and is rotated to the thrust reversing position where said blocking plate means extends transversely across said thrust diverting structure.

16. The assembly as recited in claim 15, wherein said blocking plate is pivotally mounted to said thrust diverting structure so as to be movable therewith between the cruise position and the thrust reversing position.

17. The assembly as recited in claim 16, wherein there is a blocking plate actuating means operatively connected between said blocking plate means and other structure in said assembly which is not movable with said thrust diverting structure in moving to the thrust reversing position, with said actuating means being arranged to respond to relative movement between said thrust diverting structure and said other structure to rotate said blocking plate means between the cruise position and the thrust reversing position.

18. The assembly as recited in claim 17, wherein said actuating means comprises linkage means connecting to said blocking plate means at a location spaced from an axis of rotation about which said blocking plate means rotates between the cruise position and the thrust reversing position.

19. The assembly as recited in claim 18, wherein said other structure to which the actuating means is connected comprises structure of said core engine.

20. The assembly as recited in claim 19, wherein said actuating means is connected to a nozzle plug of said core engine.

21. The assembly as recited in claim 20, wherein said blocking plate means has locking structure to interfit in locking relationship with said nozzle plug when the blocking plate means is in said cruise configuration, so as to prevent rotation of said blocking plate means in the cruise position, with said locking structure becoming disengaged from said nozzle plug when said thrust diverting structure moves toward the thrust reversing position.

22. A jet engine and thrust reversing assembly having a forward end and a rear end, said assembly comprising:
   a. an engine comprising an engine housing enclosing a thrust creating engine portion and having an intake end and an annular rear end portion from which exhaust is discharged into an exhaust area,
   b. a thrust reversing subassembly comprising:
      i. an annular thrust diverting structure having a cruise position and a thrust reversing position, said thrust reversing structure comprising a circumferential side wall which in the cruise position extends substantially entirely around said exhaust area, with a forward annular end portion of said thrust diverting structure being positioned adjacent to the annular rear end portion of the housing so as to form a rearward extension of said housing and to define a rear exhaust passageway portion from which the exhaust is discharged, said thrust diverting structure being pivotally movable about a lower hinge location from the cruise position to the thrust reversing position where an upper portion of the forward annular end portion of the thrust diverting structure is spaced rearwardly from the annular rear end portion of the housing to form an upwardly directed thrust diverting opening; and
      ii. passageway blocking plate means which in the cruise position is located to permit flow through the rear exhaust passageway portion and in the thrust reversing position blocks flow through the rear exhaust passageway portion to create with the thrust diverting structure a flow diverting region to cause the exhaust to flow through the thrust reversing opening to create a reverse thrust.

23. The assembly as recited in claim 22, further comprising vane means which, with the thrust diverting structure in said thrust reversing position, is positioned in said thrust reversing opening to properly direct flow through the thrust reversing opening.

24. The assembly as recited in claim 23, wherein said thrust diverting structure has opening means to receive said vane means when the thrust diverting structure is in said cruise position.

25. The assembly as recited in claim 23, wherein the housing has lower rear wall sections having upper edge portions to which said vane means is mounted.

26. The assembly as recited in claim 25, wherein the thrust diverting structure has lower forward wall sections which in the cruise position overlap the lower rear wall sections of the housing, and in the thrust reversing position form with the lower rear wall sections an enclosure wall means to define a lower portion of said thrust reversing region.

27. The assembly as recited in claim 26, wherein said blocking plate means is pivotally mounted at a location in said thrust diverting structure, and in the cruise configuration is aerodynamically aligned with flow through said rear exhaust passageway portion, and is rotated to the thrust reversing position where said blocking plate means extends transversely across said thrust diverting structure.

28. The assembly as recited in claim 27, wherein said blocking plate means is pivotally mounted to said thrust diverting structure so as to be movable therewith between the cruise position and the thrust reversing position.

29. The assembly as recited in claim 28, wherein there is blocking plate actuating means operatively connected between said blocking plate means and other structure in said assembly which is not movable with said thrust diverting structure in moving to the thrust reversing position, with said actuating means being arranged to respond to relative movement between said thrust diverting structure and said other structure to rotate said blocking plate means between the cruise position and the thrust reversing position.

30. The assembly as recited in claim 29, wherein said actuating means comprises linkage means connecting to said blocking plate means at a location spaced from an axis of rotation about which said blocking plate means rotates between the cruise position and the thrust reversing position.

31. The assembly as recited in claim 30, wherein said other structure to which the actuating means is connected comprises structure of said engine.

32. The assembly as recited in claim 31, wherein said actuating means is connected to a nozzle plug of said engine.

33. The assembly as recited in claim 32, wherein said blocking plate means has locking structure to interfit in locking relationship with said nozzle plug when the blocking plate means is in said cruise configuration, so as to prevent rotation of said blocking plate means in the cruise position, with said locking structure becoming disengaged from said nozzle plug when said thrust diverting structure moves toward the thrust reversing position.

34. A jet engine and thrust reversing assembly having a forward end and a rear end, said assembly comprising:
   a. an engine comprising an engine housing enclosing a thrust creating engine portion and having an intake end and an annular rear end portion from which exhaust is discharged into an exhaust area;
   b. a thrust reversing subassembly comprising:
      i. an annular thrust diverting structure having a cruise position and a thrust reversing position, said thrust reversing structure comprising a circumferential side wall which in the cruise position extends substantially entirely around said exhaust area, with a forward annular end portion of said thrust diverting structure being positioned adjacent to the annular rear end portion of the housing so as to form a rearward extension of said housing and to define a rear exhaust passageway portion from which the exhaust is discharged said thrust diverting structure being movable rearwardly from the cruise position to the thrust reversing position where at least one portion of the forward annular end portion of the thrust diverting structure is spaced rearwardly from the annular rear end portion of the fan duct structure to form a laterally directed thrust diverting opening; and
      ii. passageway blocking plate means which in the cruise position is located to permit flow through the rear exhaust passageway portion and in the thrust reversing position blocks flow through the rear exhaust passageway portion to create with the thrust diverting structure a flow diverting region to cause the primary exhaust and the fan air to flow through the thrust reversing opening to create a reverse thrust;
   c. said blocking plate means being pivotally mounted at a location in said thrust diverting structure, and in the cruise configuration being aerodynamically aligned with and positioned in, flow through said rear exhaust passageway portion, and being rotatable to the thrust reversing position where said blocking plate means extends transversely across said thrust diverting structure;
   d. said blocking plate means being pivotally mounted to said thrust diverting structure so as to be movable therewith between the cruise position and the thrust reversing position;
   e. blocking plate actuating means operatively connected between said blocking plate means and other structure in said assembly which is not movable with said thrust diverting structure in moving to the thrust reversing position, with said actuating means being arranged to respond to relative movement between said thrust reversing structure and said other structure to rotate said blocking plate means between the cruise position and the thrust reversing position;
   f. said actuating means comprising linkage means connecting to said blocking plate means at a location spaced from an axis of rotation about which said blocking plate means rotates between the cruise position and the thrust reversing position;
   g. said other structure to which the actuating means is connected comprising structure of said engine portion; and
   h. said blocking plate means having locking structure to interfit in locking relationship with said engine portion when the blocking plate means is in said cruise configuration, so as to prevent rotation of said blocking plate means in the cruise position, with said locking structure becoming disengaged from said engine portion when said thrust diverting structure moves toward the thrust reversing position.

35. A method of reversing thrust of a jet engine having a forward end and a rear end, said method comprising:
   a. providing a core engine having an intake end and an exhaust end from which primary exhaust is discharged into an exhaust area;
   b. providing a fan duct structure having an annular rear end portion and defining an annular secondary air passageway which is positioned around the core engine and which exhausts secondary air into said exhaust area;
   c. providing a fan means to blow fan air through said secondary air passageway;
   d. positioning an annular thrust diverting structure in a cruise position with said thrust reversing structure comprising a circumferential side wall which in the cruise position extends substantially entirely around said exhaust area, with a forward annular end portion of said thrust diverting structure being positioned adjacent to the annular rear end portion of the fan duct structure so as to form a rearward extension of said fan duct structure and to define a rear exhaust passageway portion from which the primary exhaust and the air from the secondary passageway are discharged;
   e. moving said thrust diverting structure rearwardly from the cruise position to a thrust reversing position where at least one portion of the forward annular end portion of the thrust diverting structure is spaced rearwardly from the annular rear end portion of the fan duct structure to form a laterally directed thrust diverting opening;
   f. initially positioning passageway blocking plate means in a cruise position where said blocking plate means is located to permit flow through the rear exhaust passageway portion and moving the blocking plate means to a thrust reversing position to block flow through the rear exhaust passageway portion to create with the thrust diverting structure a flow diverting region to cause the primary exhaust and the fan air to flow through the thrust reversing opening to create a reverse thrust;

g. transmitting lateral and longitudinal thrust reversing loads exerted on said thrust reversing subassembly into said fan duct structure which is arranged to in turn transmit said thrust reversing loads into other structure to which the jet engine and thrust reversing assembly is mounted;

h. providing vane means which, with the thrust diverting structure in said thrust reversing position, is positioned in said thrust reversing opening to properly direct flow through the thrust reversing opening; and i. moving said thrust diverting structure about a pivot mount to said fan duct structure at a lower location so that the thrust diverting structure rotates with a downward component of motion to the thrust reversing position, so that the thrust diverting opening is directed upwardly.

36. A jet engine and thrust reversing assembly having a longitudinal axis, a forward end and a rear end, said assembly comprising:

a. an engine comprising an engine housing enclosing a thrust creating engine portion and having an intake end and an annular rear end portion from which the exhaust is discharged into an exhaust area;

b. a thrust reversing subassembly comprising:

i. an annular thrust diverting structure having a cruise position and a thrust reversing position, said thrust reversing structure comprising a circumferential side wall which in the cruise position extends substantially entirely around said exhaust area, with a forward annular end portion of said thrust diverting structure being positioned adjacent to the annular rear end portion of the housing so as to form a rearward extension of said housing and to define a rear exhaust passageway portion from which the exhaust is discharged, said thrust diverting structure being pivotally movable about a hinge location from the cruise position to the thrust reversing position where a portion of the forward annular end portion of the thrust diverting structure is spaced rearwardly from the annular rear end portion of the housing to form a transversely directed thrust diverting opening; and;

ii. passageway blocking plate means which in the cruise position is located to permit flow through the rear exhaust passageway portion and in the thrust reversing position blocks flow through the rear exhaust passageway portion to create with the thrust diverting structure a flow diverting region to cause the exhaust to flow through the thrust reversing opening to create a reverse thrust.

37. The assembly as recited in claim 36, further comprising vane means which, with the thrust diverting structure in said thrust reversing position, is positioned in said thrust reversing opening to properly direct flow through the thrust reversing opening.

38. The assembly as recited in claim 37, wherein said thrust diverting structure has opening means to receive said vane means when the thrust diverting structure is in said cruise position.

39. The assembly as recited in claim 37, wherein the housing has rear wall sections having edge portions with a longitudinal alignment component to which said vane means is mounted.

40. The assembly as recited in claim 39, wherein the thrust diverting structure has forward wall sections which in the cruise position overlap the rear wall sections of the housing, and in the thrust reversing position form with the rear wall sections an enclosure wall means to define a portion of said thrust reversing region.

41. The assembly as recited in claim 40, wherein said blocking plate means is pivotally mounted at a location in said thrust diverting structure, and in the cruise configuration is aerodynamically aligned with flow through said rear exhaust passageway portion, and is rotated to the thrust reversing position where said blocking plate means extends transversely across said thrust diverting structure.

42. The assembly is recited in claim 41, wherein said blocking plate means is pivotally mounted to said thrust diverting structure so as to be movable therewith between the cruise position and the thrust reversing position.

43. The assembly as recited in claim 42, wherein there is blocking plate actuating means operatively connected between said blocking plate means and other structure in said assembly which is not movable with said thrust diverting structure in moving to the thrust reversing position, with said actuating means being arranged to respond to relative movement between said thrust diverting structure and said other structure to rotate said blocking plate means between the cruise position and the thrust reversing position.

44. The assembly as recited in claim 43, wherein said actuating means comprises linkage means connecting to said blocking plate means at a location spaced from an axis of rotation about which said blocking plate means rotates between the cruise position and the thrust reversing position.

45. The assembly as recited in claim 44, wherein said other structure to which the actuating means is connected comprises structure of said engine.

46. The assembly as recited in 45, wherein said actuating means is connected to a nozzle plug of said engine.

47. The assembly as recited in claim 46, wherein said blocking plate means has locking structure to interfit in locking relationship with said nozzle plug when the blocking plate means is in said cruise configuration, so as to prevent rotation of said blocking plate means in the cruise position, with said locking structure becoming disengaged from said nozzle plug when said thrust diverting structure moves toward the thrust reversing position.

48. The assembly as recited in claim 36, wherein said blocking plate means is pivotally mounted in said assembly at a location in said thrust diverting structure, and in the cruise configuration is aerodynamically aligned with flow through said rear exhaust passageway portion, and is rotated to the thrust reversing position where said blocking plate means extends transversely across said thrust diverting structure.

49. The assembly as recited in claim 48, wherein said blocking plate means is pivotally mounted to said thrust diverting structure so as to be movable therewith between the cruise position and the thrust reversing position.

50. The assembly as recited in claim 49, wherein there is blocking plate actuating means operatively connected between said blocking plate means and other structure in said assembly which is not movable with said thrust diverting structure in moving to the thrust reversing position, with said actuating means being arranged to respond to relative movement between said thrust diverting structure and said other structure to rotate said blocking plate means between the cruise position and the thrust reversing position.

51. The assembly as recited in claim 50, wherein said actuating means comprises linkage means connecting to said blocking plate means at a location spaced from an axis of rotation about which said blocking plate means rotates between the cruise position and the thrust reversing position.

52. The assembly as recited in claim 50, wherein said other structure to which the actuating means is connected comprises structure of said engine.

53. The assembly as recited in claim 52, wherein said actuating means is connected to a nozzle plug of said engine.

54. The assembly as recited in claim 53, wherein said blocking plate means has locking structure to interfit in locking relationship with said nozzle plug when the blocking plate means is in said cruise configuration, so as to prevent rotation of said blocking plate means in the cruise position with said locking structure becoming disengaged from said nozzle plug when said thrust diverting structure moves toward the thrust reversing position.

55. The assembly as recited in claim 36, wherein said blocking plate means is located within said exhaust area in a manner that in the cruise position the flow through the rear exhaust passageway portion passes on opposite sides of said plate means.

56. The assembly as recited in claim 55, wherein said plate means is pivotally mounted at a pivot location between forward and rear portions of said plate means in a manner that with said plate means moving to the thrust reversing position, said forward and rear portions of the plate means move oppositely to the thrust reversing position.

57. The assembly as recited in claim 56, wherein there is blocking plate actuating means operatively connected between said blocking plate means and other structure in said assembly which is not movable with said thrust diverting structure in moving to the thrust reversing position with said actuating means being arranged to respond to relative movement between said thrust diverting structure and said other structure to rotate said blocking plate means between the cruise position and the thrust reversing position.

58. A jet engine and thrust reversing assembly having a forward end and a rear end, said assembly comprising:
   a. a core engine having an intake end and an exhaust end from which primary exhaust is discharged into an exhaust area;
   b. a fan duct structure having an annular rear end portion and defining an annular secondary air passageway which is positioned around the core engine and which exhausts secondary air into said exhaust area;
   c. fan means to blow fan air through said secondary air passageway;
   d. a thrust reversing subassembly comprising:
      i. an annular thrust diverting structure having a cruise position and a thrust reversing position, said thrust reversing position comprising a circumferential side wall which in the cruise position extends substantially entirely around said exhaust area, with a forward annular end portion of said thrust diverting structure being positioned adjacent to the annular rear end portion of the fan duct structure so as to form a rearward extension of said fan duct structure and to define a rear exhaust passageway portion from which the primary exhaust and the air from the secondary passageway are discharged, said thrust diverting structure being movable rearwardly from the cruise position to the thrust reversing position where at least one portion of the forward annular end portion of the thrust diverting structure is spaced rearwardly from the annular rear end portion of the fan duct structure to form a laterally directed thrust diverting opening; and
      ii. passageway blocking plate means which in the cruise position is located to permit flow through the rear exhaust passageway portion and in the thrust reversing position blocks flow through the rear exhaust passageway portion to create with the thrust diverting structure a flow diverting region to cause the primary exhaust and the fan air flow to flow through the thrust reversing opening to create a reverse thrust;
   e. said thrust diverting structure being pivotally mounted to said fan duct structure at a pivot location so that the thrust diverting structure rotates about said pivot location to the thrust reversing position.

59. The assembly as recited in claim 58, wherein said thrust diverting structure is pivotally mounted to said fan duct structure at said pivot location which is at a lower location so that the thrust diverting structure rotates with a downward component of motion to the thrust reversing position, so that the thrust diverting opening is directed upwardly.

60. The assembly as recited in claim 58, further comprising vane means which, with the thrust diverting structure in said thrust reversing position, is positioned in said thrust reversing opening to properly direct flow through the thrust reversing opening.

61. The assembly as recited in claim 60, wherein said thrust diverting structure has opening means to receive said vane means when the thrust reversing structure is in said cruise position.

62. The assembly as recited in claim 61, wherein the fan duct structure has lower rear wall sections having edge portions with a longitudinal alignment component to which said vane means is mounted.

63. The assembly as recited in claim 62, wherein the thrust diverting structure has forward wall sections which in the cruise position overlap the rear wall sections of the fan duct structure, and in the thrust reversing position form with the rear wall sections an enclosure wall means to define a portion of said thrust reversing region.

64. The assembly as recited in claim 58, wherein said blocking plate means is pivotally mounted at a location in said assembly, and in the cruise configuration is aerodynamically aligned with flow through said rear exhaust passageway portion, and is rotated to the thrust reversing position where said blocking plate means extends transversely across said thrust diverting structure.

65. The assembly as recited in claim 64, wherein said blocking plate means is pivotally mounted to said thrust diverting structure so as to be movable therewith between the cruise position and the thrust reversing position.

66. The assembly as recited in claim 65, wherein there is blocking plate actuating means operatively connected between said blocking plate means and other structure in said assembly which is not movable with said thrust diverting structure in moving to the thrust reversing position, with said actuating means being arranged to respond to relative movement between said thrust diverting structure and said other structure to rotate said blocking plate means between the cruise position and the thrust reversing position.

67. The assembly as recited in claim 66, wherein said actuating means comprises linkage means connecting to said blocking plate means at a location spaced from an axis of rotation about which said blocking plate means rotates between the cruise position and the thrust reversing position.

68. The assembly as recited in claim 67, wherein said other structure to which the actuating means is connected comprises structure of said core engine.

69. The assembly as recited in claim 68, wherein said actuating means is connected to a nozzle plug of said core engine.

70. The assembly as recited in claim 69, wherein said blocking plate means has locking structure to interfit in locking relationship with said nozzle plug when the blocking plate means is in said cruise configuration, so as to prevent rotation of said blocking plate means in the cruise position, with said locking structure becoming disengaged from said nozzle plug when said thrust diverting structure moves toward the thrust reversing position.

71. The assembly as recited in claim 58, wherein said blocking plate means is located within said exhaust area in a manner that in the cruise position to flow through the rear exhaust passageway portion passes on opposite sides of said plate means.

72. The assembly as recited in claim 71, wherein said plate means is pivotally mounted at a pivot location between forward and rear portions of said plate means in a manner that with said plate means moving to the thrust reversing position, said forward and rear portions of the plate means move oppositely to the thrust reversing position.

73. The assembly as recited in claim 72, wherein there is blocking plate actuating means operatively connected between said blocking plate means and other structure in said assembly which is not movable with said thrust diverting structure in moving to the thrust reversing position with said actuating means being arranged to respond to relative movement between said thrust diverting structure and said other structure to rotate said blocking plate means between the cruise position and the thrust reversing position.

74. A jet engine and thrust reversing assembly having a forward end and a rear end, said assembly comprising:

a. a core engine having an intake end and an exhaust end from which primary exhaust is discharged into an exhaust area;

b. a fan duct structure having an annular rear end portion and defining an annular secondary air passageway which is positioned around the core engine and which exhausts secondary air into said exhaust area;

c. fan means to blow fan air through said secondary air passageway;

d. a thrust reversing subassembly comprising:
   i. an annular thrust diverting structure having a cruise position and a thrust reversing position, said thrust reversing structure comprising a circumferential side wall which in the cruise position extends substantially entirely around said exhaust area, with a forward annular end portion of said thrust diverting structure being positioned adjacent to the annular rear end portion of the fan duct structure so as to form a rearward extension of said fan duct structure and to define a rear exhaust passageway portion from which the primary exhaust and the air from the secondary passageway are discharged, said thrust diverting structure being movable rearwardly from the cruise position to the thrust reversing position where at least one portion of the forward annular end portion of the thrust diverting structure is spaced rearwardly from the annular rear end portion of the fan duct structure to form a laterally directed thrust diverting opening; and
   ii. passageway blocking plate means which in the cruise position is located to permit flow through the rear exhaust passageway portion and in the thrust reversing position blocks flow through the rear exhaust passageway portion to create with the thrust diverting structure a flow diverting region to cause the primary exhaust and the fan air to flow through the thrust reversing opening to create a reverse thrust;

e. said assembly being characterized in that lateral and longitudinal thrust reversing loads exerted on said thrust reversing subassembly are transmitted into said fan duct structure which is arranged to in turn transmit said thrust reversing loads into other structure to which the jet engine and thrust reversing assembly is mounted;

f. said thrust diverting structure being pivotally mounted to said fan duct structure at a lower location so that the thrust diverting structure rotates with a downward component of motion to the thrust reversing position, so that the thrust diverting opening is directed upwardly;

g. the fan duct structure having lower rear wall sections having upper edge portions to which a vane means is mounted; and h. the thrust diverting structure having lower forward wall sections which in the cruise position overlap the lower rear wall sections an enclosure wall means to define a lower portion of said thrust reversing region.

* * * * *